United States Patent [19]
Pomella et al.

[11] 3,946,189
[45] Mar. 23, 1976

[54] ELECTROEROSION APPARATUS HAVING A CYCLICALLY MOVABLE AND VARIABLY INCLINED WIRE ELECTRODE

[75] Inventors: Piero Pomella; Luciano Lauro, both of Ivrea (Turin); Pier Gianni Scotti, Strambino (Turin), all of Italy

[73] Assignee: Ing. C. Olivetti & C., S.p.A., Ivrea (Turin), Italy

[22] Filed: July 1, 1974

[21] Appl. No.: 484,735

Related U.S. Application Data

[63] Continuation of Ser. No. 304,708, Nov. 8, 1972, abandoned.

[30] Foreign Application Priority Data
Nov. 9, 1971  Italy .................................. 70657/71

[52] U.S. Cl. ............................. 219/69 E; 219/69 V
[51] Int. Cl.² ........................................... B23P 1/08
[58] Field of Search... 219/69 R, 69 G, 69 V, 69 M, 219/69 C; 318/571; 235/151.11

[56] References Cited
UNITED STATES PATENTS

| | | | |
|---|---|---|---|
| 3,731,043 | 5/1973 | Ullmann et al. | 219/69 V |
| 3,731,044 | 5/1973 | Ullmann et al. | 219/69 V |
| 3,731,045 | 5/1973 | Ullmann et al. | 219/69 V |

FOREIGN PATENTS OR APPLICATIONS
728,204   12/1966   Italy

*Primary Examiner*—Bruce A. Reynolds
*Attorney, Agent, or Firm*—I. J. Schaefer

[57] ABSTRACT

An electroerosion apparatus utilizing a wire electrode supported at opposite sides of a workpiece is adapted to cut a given profile in the workpiece with a rake by shifting the electrode supports and thereby inclining the electrode with respect to the cutting plane. The electrode supports are at the end of two arms which can move in coordinate axes in conjunction with the movement of the workpiece table to define the profile by means of orthogonal coordinate control.

32 Claims, 18 Drawing Figures

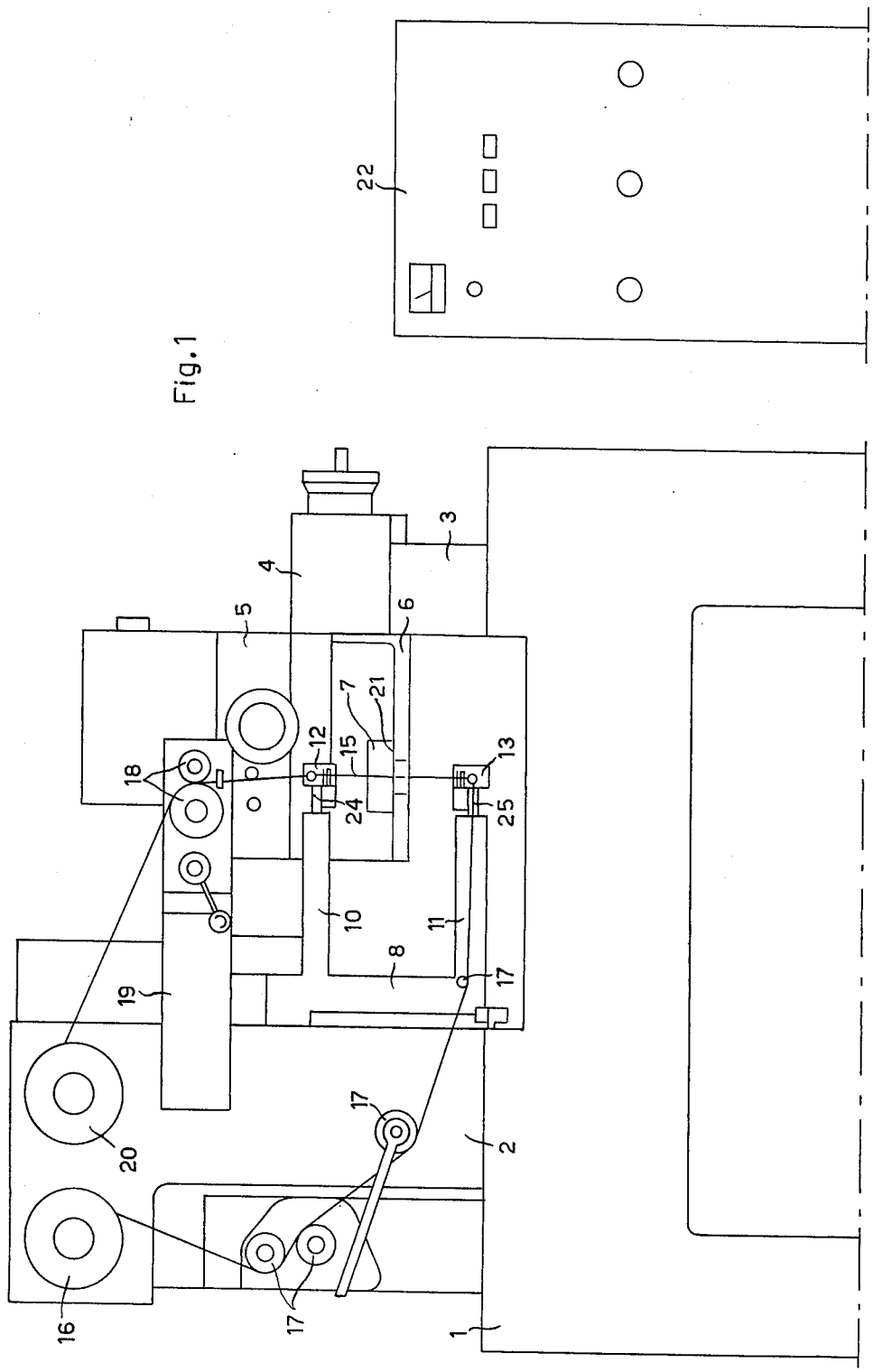

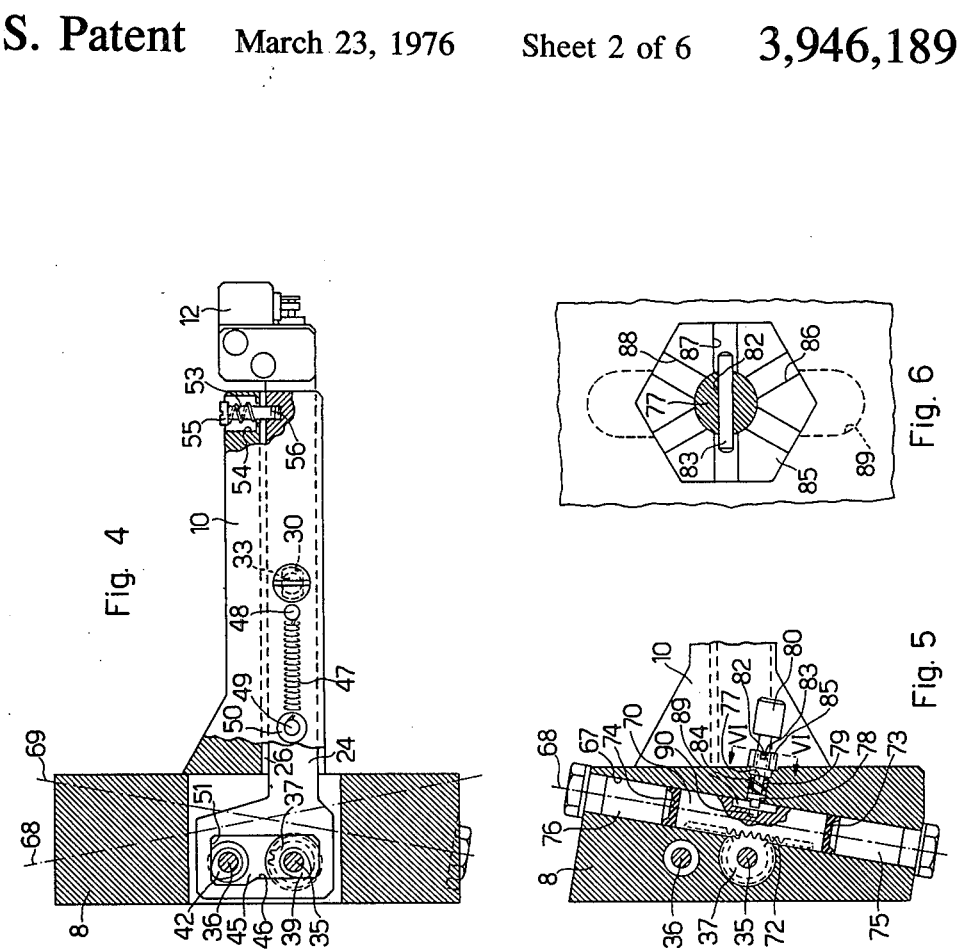
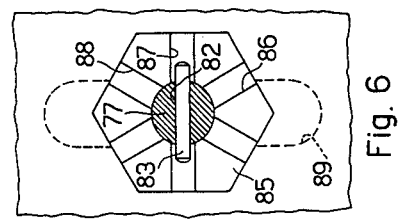
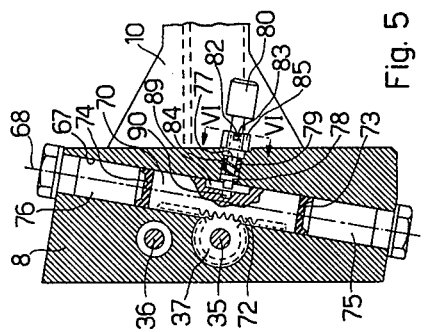
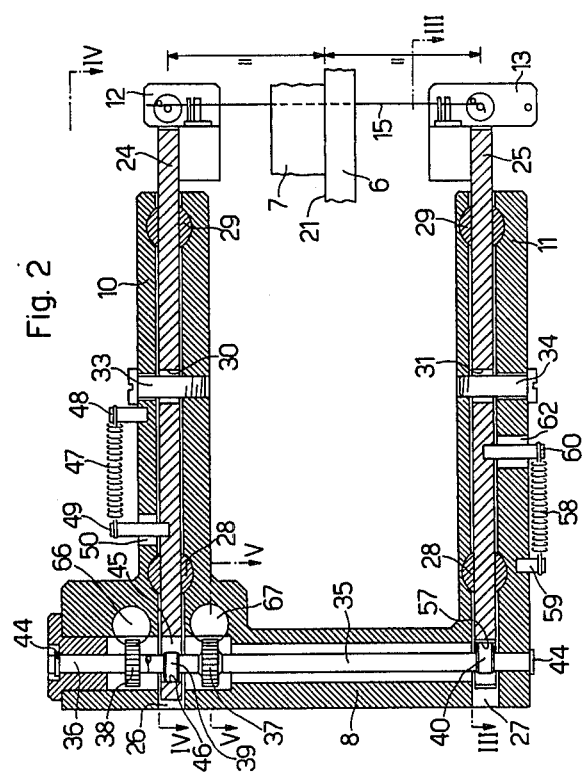
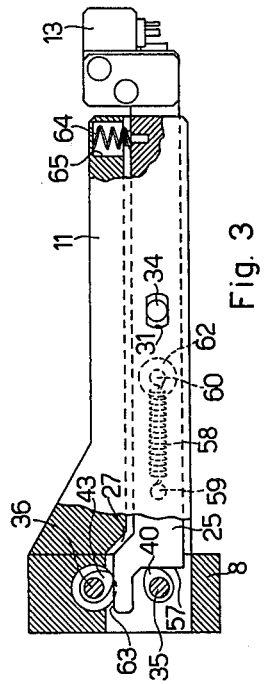

ELECTROEROSION APPARATUS HAVING A CYCLICALLY MOVABLE AND VARIABLY INCLINED WIRE ELECTRODE

This is a continuation of application Ser. No. 304,708 filed Nov. 8, 1972, abandoned.

BACKGROUND OF THE INVENTION

The present invention relates to a machine for cutting metal workpieces by electroerosion, comprising a cutting wire supported at two points on opposite sides with respect to the piece to be cut.

Known electroeroding machines generally cut a workpiece being machined along cylindrical surfaces by means of a wire which is kept taut between the ends of two arms, the wire being continuously fed while maintaining the taut condition. Between the arms is placed the workpiece, which can moved, controlled numerically, along two axes X and Y.

These arms are normally rigid and keep the wire perpendicular to the plane in which the workpiece moves, as a result of which these machines can only cut the piece along surfaces which are perpendicular to said plane.

The problem of forming surfaces with generatrices inclined with respect to the perpendicular to the aforesaid plane arisen frequently. This is the case, for example, with the lower sections of blanking dies, which are constituted by a plate provided with a through opening, the surface of which has a rake of the order of some ten minutes to allow the expulsion of the blanked pieces from the body of the die. This rake is generally obtained by means of a grinding operation following the cutting, as a result of which the construction of dies becomes very costly.

The object of the present invention is to overcome this problem.

SUMMARY OF THE INVENTION

According to the invention, there is provided a machine for cutting metal workpieces by electroerosion, comprising two wire supports on opposite side of a cutting zone, means for tensioning a cutting wire between the two supports, a workpiece table for supporting a workpiece, feed means for effecting relative movement between the table and the wire supports in directions which are transverse with respect to the wire and are contained in the cutting plane, to cause the wire to cut a profile through a workpiece on the table, and means for adjusting the positions of the wire supports relative to each other in directions parallel to the cutting plane to enable the cutting angle of the wire to be inclined relative to the perpendicular to the cutting plane.

If it is desired to form the rake of a die directly with the electroeroding machine, it is necessary that the wire be suitably inclined at every point with respect to the perpendicular to the plane of movement of the workpiece. It is also necessary that this inclination does not produce variations in the profile of the cutting edge of the die, which is required to be defined exclusively by the movements of the table of the electroeroding machine along the axes X and Y. In order to obtain this profile with the rake, it is preferred that the said points are movable simultaneously in opposite directions so that the wire turns about the point of contact with the lower surface of the workpiece, the said points being each movable in accordance with two co-ordinates as a function of the movement of the table.

BRIEF DESCRIPTION OF THE DRAWINGS

The following description illustrates two preferred embodiments of the invention, given by way of example, with reference to the accompanying drawings, in which:

FIG. 1 is a front view of an electoerosion machine;

FIG. 2 is a partial vertical section of the machine on a larger scale in accordance with a first embodiment of the invention;

FIG. 3 is a section taken on the line III—III of FIG. 2;

FIG. 4 is a section taken on the line IV—IV of FIG. 2;

FIG. 5 is a section on the line V—V of FIG. 2;

FIG. 6 is a section on a further enlarged scale taken on the line VI—VI of FIG. 5;

DESCRIPTION OF A PREFERRED EMBODIMENT

Figure 7:
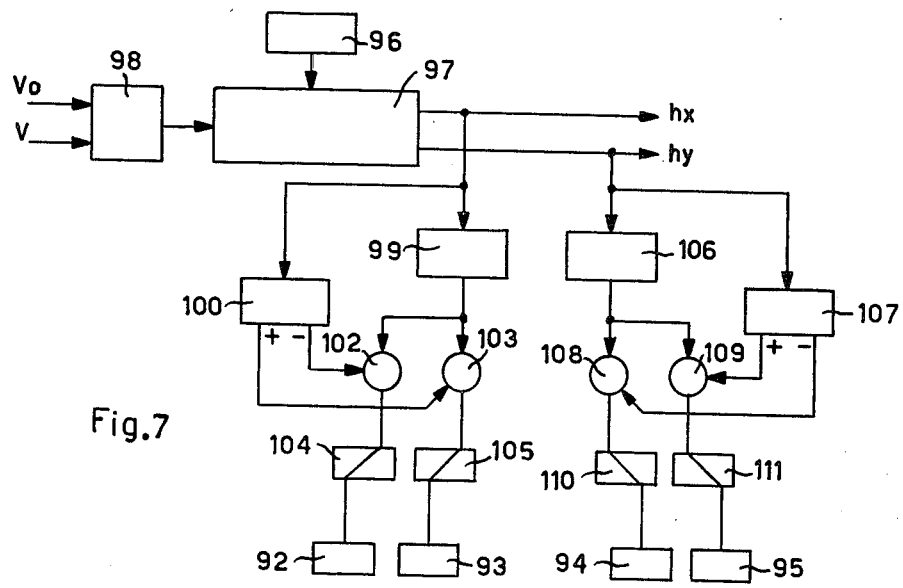
FIG. 7 is a block diagram of the control apparatus of the machine of FIG. 2.

In the following description, the workpiece being machined is the lower section of a blanking die.

Referring to FIG. 1, the electoerosion machine comprises a bed 1 on which there are fixed a standard 2 and a crosspiece 3. A first table 4 is slidable transversely on this crosspiece slidable on the first table, in a direction perpendicular to the crosspiece 3, is a second table 5. This bears a right-angled support 6 on which there is fixed in known manner a plate 7 to be cut. The tables 4 and 5 are controlled numerically along two axes X and Y in manner known per se.

On the standard 2 there is fixed a frame 8 bearing two projections 10 and 11. At the ends of the projections 10 and 11 there are disposed two wire-guiding heads 12 and 13 between which is stretched a wire 15 constituting the cutting wire of the machine. The wire 15 is unwound from a reel 16 and, guided by means of a series of rollers 17, arrives at the head 13. From the head 12 the wire 15 is guided between two rollers 18 carried by a bracket 19 fixed on the standard 2. The rollers 18 control the feed of the wire 15 in known manner at a rate predetermined according to the workpiece 7 to be cut. The used wire 15 is thereupon rewound on another reel 20 arranged on the standard 2 and rotated through a friction clutch.

The two heads 12 and 13 are disposed on opposite sides and at the same distance with respect to the upper surface 21 of the support 6. The lower surface of the workpiece 7 to be cut is therefore always in correspondence with the mid-point of the segment of wire 15 between the two heads 12 and 13.

The machine is moreover provided with a supply unit 22 comprising a battery of capacitors adapted to establish a difference of voltage at a predetermined frequency between the wire 15 and the piece 7, thus effecting the cutting of the piece 7 by electroerosion. The working feed is effected by means of a displacement of the tables 4 and 5 along the two axes X and Y at a speed such as to keep the wire substantially equidistant from the piece.

According to a first embodiment of the invention the two heads 12 and 13 are carried by two arms 24 and 25 (FIG. 2) which are of equal lenght and are movable in two corresponding openings 26 and 27 in the projections 10 and 11. More particularly, each of the arms 24 and 25 is guided in an opening of a corresponding pair of bearings 28 and 29 of cylindrical form. The arms 24 and 25 are respectively pivoted by means of two slotted holes 30 and 31 on two pins 33 and 34 fixed by their ends in the oepnings 26 and 27 of the projections 10 and 11.

Inside the frame 8 there are rotatably mounted the ends of two vertical shafts 35 and 36 located one beside the other. Two corresponding gears 37 and 38 are fixed on the shafts 35 and 36. The shaft 35 has two cams 39 and 40 each approximately in correspondence with the mid line of the projections 10 and 11. The cams 39 and 40 are alike, but are turned or offset through 180° one with respect to the other. The shaft 36 (FIGS. 3 and 4), in turn, has two cams 42 and 43 which are alike, but offset through 180° and respectively situated in the same planes as the cams 39 and 40. Both the shafts 35 and 36 are retained axially by two shoulder or abutment flanges 44 (FIG. 2).

The arm 24 (FIG. 4) is provided at the end remote from the head 12 with a window 45 having a surface 46 perpendicular to the axis of the arm 24 itself. The surface 46 is normally held bearing against the cam 39 of the shaft 35 by means of a spring 47 stretched between a pin 48 on the projection 10 and a pin 49 on the arm 24 extending through a hole 50 in the said projection 10. The window 45 is moreover provided with a surface 51 parallel to the axis of the arm 24 and normally bearing against the cam 42 of the shaft 36 with the aid of a compression spring 53 disposed in a recess 54 of the projection 10 between the base of the recess 54 and a flange of a pin 56 fixed to the arm 24 and extending through a hole in the base itself of the recess 54.

The arm 25 (FIG. 3), in turn, is provided with a surface 57 perpendicular to the axis of the arm itself and normally bearing against the cam 40 of the shaft 35 with the aid of a spring 58 stretched between a pin 59 on the projection 11 and a pin 60 on the arm 25 extending through a hole 62 in the said projection 11. The arm 25 is moreover provided with a surface 63 perpendicular to the surface 57 and normally bearing against the cam 43 of the shaft 36 with the aid of a compressing spring 64 disposed in a recess 65 inside the projection 11 between the arm 25 itself and the base of the recess 65.

The gears 37 and 38 can be rotated in both directions by two hydraulic cylinders indicated generally by the reference 66 and 67 (FIG. 2) and disposed along the axes 68 and 69 (FIG. 4). Since the two cylinders 66 and 67 are identical, only the cylinder 67 will be described in relation to the gear 37. The cylinder 67, in which a slide 70 is slidably housed, is formed in the frame 8 (FIG. 5) in correspondence with the gear 37. On the said slider is formed a rack 72 meshing with the gear 37, while at its ends are fixed two pistons 73 and 74. The two ends of the cylinder 67 are closed and define two chambers 75 and 76 into which oil under pressure can be introduced to cause the slide 70 to slide along the cylinder 67.

The maximum stroke of the slide 70 in the two directions is defined by a stop pin 77. This pin 77 has a flange 78 against which a compression spring 79 acts. At the outer end of the pin 77 there is arranged a knob 80, while in a diametral hole 82 in the pin 77 there is securely inserted a cotter pin 83.

The pin 77 can slide in a hole 84 in the frame 8 and in a nut 85 fast with the frame 8. The nut 85 (FIG. 6) has three slots 86, 87 and 88 of different depths into which the cotter pin 83 can be inserted. The action of the spring 79 presses the cotter pin 83 against the base of the slots 86, 87 and 88. When the cotter 83 is inserted in the slot 86, the pin 77 is located outside the cylinder 67. When the cotter 83 is inserted in the slot 87, the pin 77 can co-operate with a slot 89 in the slide 70, while by inserting it in the slot 88 the pin 77 can introduce itself into a hole 90 (FIG. 5) in the slide 70.

The entry of the oil under pressure into the chamber 75 or the chamber 76 of the hydraulic cylinder 67 is controlled by two electric valves 95 and 94, respectively, (FIG. 7).

The hydraulic cylinder 66 (FIG. 2) is controlled by means of another two electric valves 92 and 93 (FIG. 7). The electric valves 92, 93, 94, 95 act in a logical relation with the movements of the tables 4 and 5. FIG. 7 shows the block diagram of the control appartus of this logical relation.

This apparatus is substantially of the type described in detail in the Applicants' Italian Patent No. 728.204. More particularly, the apparatus comprises a punched tape reader 96 which is adapted to supply periodically the co-ordinates x, y, recorded on the tape, of the points that the workpiece 7 must reach. These co-ordinates are received by a linear interpolator 97 known per se which is adapted to compute for each length of movement or distance of displacement of the piece 7 the quantities hx and hy which indicate in numeric form the acceleration which each table 4 and 5 can assume in that length or distance.

Moreover, the interpolator 97 is adapted to compute in numeric form with a given frequency, that is at predetermined time interval, the increment of movement of the two tables, which is indicated here by $\Delta x$ and $\Delta y$. More particularly, in the (N+1)th time interval there are the increments $\Delta x_{n+1} = \Delta x_n \pm h_x$
$\Delta y_{n+1} = \Delta y_n \pm h_y$ Suitable analogue numeric converters transform these increments into analogue speeds of the tables 4 and 5 and command the corresponding servomechanisms.

When the permitted maximum speed is reached along each axis, the summing of the quantities $hx$ and $hy$ is inhibited, as a result of which the tables 4 and 5 move at constant speed. To effect the stopping of the tables 4 and 5, the increments are gradually reduced in each interval by the quantities $hx$ and $hy$ until the new position is reached, in the manner described in the patent referred to. The quantities $hx$ and $hy$ are indicative both of the movement and of the sign of the movement of the tables along the two axes.

In fact, the movement increments $\Delta x$ and $\Delta y$ are computed by the above-mentioned apparatus as the repeated sum of the quantities $hx$ and $hy$. Moreover, the quantities $hx$ and $hy$ issue from the interpolator in direct form or in the form of a complement, respectively, if the direction of movement of the tables is positive or is negative.

The maximum feed rate of the table is controlled by an adaptive control unit 98 for the electroerosion cutting, which has the task of establishing at each time interval a relation of dependence between the speeds computed by the interpolator 97 and the values of the voltage of the wire 15 with respect to the workpiece 7 being machined.

As is known, this voltage may vary from a minimum admissible value, corresponding to the minimum distance between the wire and the workpiece below which there would be a short circuit, to a maximum value Vm.

The adaptive control unit 98 receives as input the signals V, Vo which are respectively proportional to the effective voltage, suitable reduced and smoothed, and to the minimum admissible voltage. It then computes the signal $\Delta V = V - Vo$, amplifies it and converts it into a digital signal. If $\Delta V$ is zero, it conditions the interpolator 97 in such manner as to arrest the tables, so that it causes the speed computed by the interpolator 97 to be reduced by 100%, thus avoiding a short circuit between the wire 15 and the workpiece 7.

If $\Delta V$ is the maximum, that is signifying that the voltage of the wire V is equal to the maximum voltage Vm, the control unit 98 does not effect any reduction in the speed of the tables computed by the interpolator 97. It $\Delta V$ is intermediate between the two aforesaid values, the adaptive control unit 98 effects a reduction in the speeds computed by the interpolator 97 which is substantially inversely proportional to the value $\Delta V$, so as to allow the voltage of the wire V to increase in value.

The quantity $hx$ computed by the interpolator 97 is input to a decoder 99, which presents as output only two possible configurations: a zero output signal if the input quantity $hx$ is zero, an output signal at level 1 if the input quantity $hx$ is different from zero.

The quantity $hx$ is moreover input to a sign decoder 100 which, according to whether the sign of $hx$ is positive, or $hx$ is in direct form, or negative, or $hx$ is in the form of a complement, enables corresponding gates 103 and 102, respectively. The output of the decoder 99 is connected through the gate 102 to a circuit 104 commanding the electric valve 92 and through the gate 103 to a circuit 105 commanding the electric valve 93. The quantity $hy$, in turn, constitutes the input of a system entirely similar to the preceding one and comprising a decoder 106 for the value of $hy$, a decoder 107 for the respective sign, two gates 108 and 109 and two circuits 110 and 111 commanding the electric valves 94 and 95.

The machine of FIG. 2 operates in the following manner.

Figure 9:
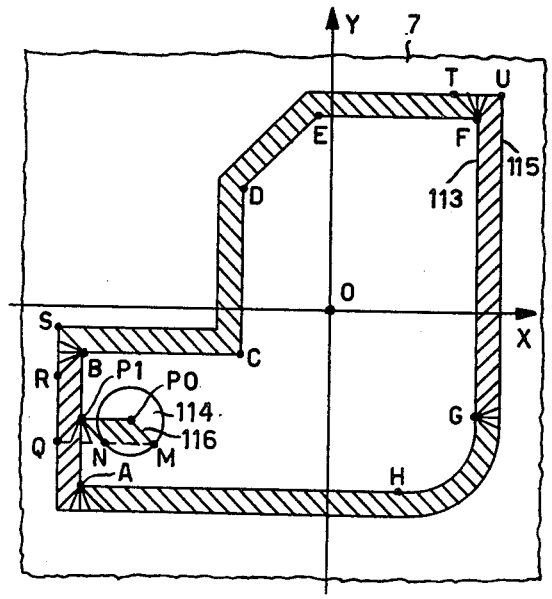
FIG. 9 shows the various cutting stages of the machine of FIG. 2.

Let it be assumed that it is necessary to cut in a plate 7 (FIG. 9) a window or opening having a mixed-line profile 113. FIG. 9 shows the plate as seen from above. The profile 113 is composed of sections or lenghts which have their ends at the points A,B,C,D,E,F,G,H, with the sections AB,CD,FG, rectilinear and parallel to the axis Y, the sections BC,EF,HA rectilinear and parallel to the axis X, the section DE rectilinear and inclined with respect to the axes X and Y, while the section GH is a circular arc.

The plate 7 moreover has a through hole 114 inside the profile 113 and located at the side of a mid point P1 of the section AB, from which it is desired to commence the cutting, the same being then executed following the profile 113 clockwise. The axes X and Y have their origin at the point O, the centre of the die of which the plate 7 forms part and to which the co-ordinates recorded on the punched programme tape are referred.

In a first stage, the point O is positioned on the vertical passing through the heads 12 and 13, these being in their rest or inoperative position, both disposed on the same perpendicular to the plane XY. The wire 15 is not yet mounted on the machine. Moreover, the stop pin 77 (FIG. 5) is fixed with its ends in correspondence with the slot 89, the cotter pin 83 being inserted in the slot 87 (FIG. 6). The machihe is then started with the supply unit 22 (FIG. 1) cut out.

The tape reader 96 (FIG. 7) reads the first block of instructions, which supplies the co-ordinates of a point PO (FIG. 9) inside the hole 114 and located at the same distance as the point P1 from the axis X. The interpolator 97 (FIG. 7) computes the quantities $hx$ and $hy$ corresponding to the movement of the tables 4 and 5 adapted to bring the point PO to O.

The movement of the table 5 takes place in the positive direction along the axis Y. The sign decoder 107 therefore activates the gate 109, which allows the output signal of the decoder 106 to energize the circuit 111, which commands the opening of the electric valve 95. This actuates the hydraulic cylinder 67 (FIG. 2), introducing oil under pressure into the chamber 75 of the same cylinder 67 (FIG. 5). The oil under pressure moves the piston 73, which shifts the slide 70 until the lower wall of the slot 89 is arrested against the pin 77.

During the movement of the slide 70, the rack 72 rotates the gear 37 anticlockwise together with the cams 39 and 40 (FIGS. 3 and 4). The cam 39 allows the spring 47 to shift the arm 24 to the right in a direction perpendicular to the axis Y, while the cam 40 allows the spring 58 to shift the arm 25 to the left by the same amount also in a direction perpendicular to the axis Y. The arms 24 and 25 shift the heads 12 and 13 by the same amounts indicated by $\Delta Sy$ and $-\Delta Sy$ in FIG. 8, in which the heads are represented by a point.

The movement of the table 4 is also positive, but along the axis X. The sign decoder 100 (FIG. 7) therefore activates the gate 103, which allows the output signal of the decoder 99 to energize the circuit 105, which commands the opening of the electric valve 93. This valve actuates the hydraulic cylinder 66 (FIG. 2), which acts in a manner perfectly similar to that described hereinbefore in the case of the hydraulic cylinder 67, ultimately producing the clockwise rotation of the gear 38. This gear rotates the cams 42 and 43 (FIGS. 3 and 4), the first of which turns the arm 24 clockwise about the pins 33, while the second turns the arm 25 about the pin 34 by the same amount, but anticlockwise. The arms 24 and 25 shift the heads 12 and 13 by the amounts ΔSx and —ΔSx indicated in FIG. 8. It should be noted that, the arms 24 and 25 being considerably longer that the arcs described by the ends of the arms themselves and, therefore, by the two heads 12 and 13, the said arcs can be assimilated to two rectilinear sections or lenghts ΔX and — ΔSx perpendicular to the axis X.

The two movements of translation and rotation of each of the arms 24 and 25 are obviously simultaneous, the quantites $hx$ and $hy$ being computed by the interpolator 97 substantially at the same instant.

Figure 8:
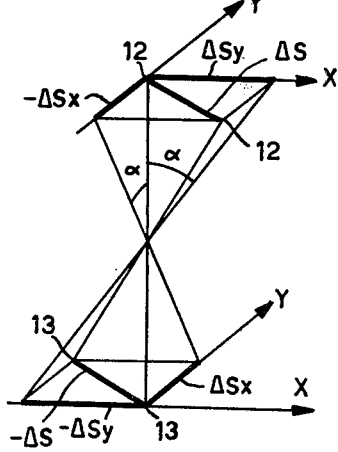
FIG. 8 is a diagrammatic representation of a movement of the connection or attachment points of the cutting wire of the machine of FIG. 2.

FIG. 8 shows the movements ΔS and —ΔS which the heads 12 and 13 perform from the initial position located on the vertical to the plane XY to the new position, when the tables 4 and 5 (FIG. 1) initiate the movement of the point PO towards the point O. The arms 24 and 25 hold the heads 12 and 13 in the new position for the whole of the movement of the tables 4 and 5 adapted to bring the point PO to O.

This movement having been performed, the control unit causes the tables 4 and 5 to stop on the basis of the programme. The operator then mounts the wire 15 on the machine, causing it to pass through the hole 114 (FIG. 9). The wire 15 mounted in this way now passes exactly through the point PO and is inclined with respect to the perpendicular to the plane XY in consequence of the movements of the heads 12 and 13 seen hereinbefore. In fact, as has already been stated hereinbefore, the two heads 12 and 13 are disposed on opposite sides and at the same distance with respect to the upper surface 21 of the support 6 (FIG. 2) and, therefore, the lower surface of the plate 7 is always in corresondence with the mid point of the segment of the wire 15 between the heads 12 and 13. It will readily be understood that the wire 15 is turned about the point of contact with the lower surface of the plate 7, and therefore the position that this point of contact assumes instant by instant is independent of the movements of the arms 24 and 25 and depends exclusively on the programme on the tape.

To facilitate the understanding of this description the axis perpendicular to the plane XY will be indicated by the reference Z. The various inclinations that the wire 15 may assume may therefore be defined by means of its rotations in the coordinated planes XZ and YZ, there being understood as positive a rotation in the plane XZ when this takes place clockwise with respect to an observer positioned in the positive direction of the axis Y. Anticlockwise rotation will be negative. Similarly, a rotation in the plane YZ will be positive when this takes place clockwise with respect to an observer positioned in the positive direction of the axis X. Anticlockwise rotation will be negative.

The movements Sx and Sy may vary within wide limits and may be equal or different to one another. This obviously depends on the proportioning of the parts of the mechanism which achieve the same. However, in order to simplify the following part of the description, it will be assumed that the two movements are equal. As has already been said, at the point PO the wire 15 is inclined both with respect to the plane XZ and with respect to the plane YZ (FIG. 8) by an angle which will be indicated as $\alpha$ and is negative with respect to both planes. In a second stage, the operator applies a voltage to the wire 15 by switching on the supply unit 22 (FIG. 1) and starts the machine again. The tape reader 96 (FIG. 7) reads the second block of instructions, which supplies the co-ordinates x and y of the point P1 to the interpolator 97, which computes the quantities $hx$ and $hy$ corresponding to the new length of movement P1 PO of the tables 4 and 5. The quantity $hx$ is now positive, while the quantity $hy$ has zero value. The preceding conditions being maintained, the electric valve 93 will remain open and therefore the wire 15 will preserve its negative inclination $\alpha$ with respect to the plane YZ.

In view of the zero value of $hy$, the gate 109 is deactivated and therefore the electric valve 95 closes. This, however, does not nullify the inclination of the wire 15 with respect to the plane XZ, inasmuch as the frictional forces keep the slide 70 and the cam shaft 35 in the position reached in the preceding stage. The slide 70 can shift only by means of the inlet of oil under pressure into the chamber 76 of the cylinder 67 through the electric valve 94, which intervenes when the reader 96 reads on the punched tape a negative movement on the axis Y. This naturally also applies to the inclinations of the wire with respect to the plane YZ.

The wire 15 therefore cuts the section PO-P1 forming a surface raked by a constant negative angle. In spite of the wire 15 being inclined by the angle $\alpha$ with respect to the two planes XZ and YZ, the raked surface will have an inclination with respect to the axis Z equal to the inclination of the wire 15 with respect to the plane YZ only, that is will be inclined by the angle $\alpha$. In FIG. 9, a line 115 indicates the line described by the point of contact of the wire 15 with the upper surface of the plate 7. This line 115 shows that the aforesaid point of contact has shifted from the point M corresponding to the point PO to the point N corresponding to the point P1. In the zone between the two lines 113 and 115 there are marked segments 116 indicating in various positions the segment of wire 15 between the two surfaces, that is the upper and lower surfaces, of the plate 7.

When the point of contact of the wire 15 with the lower surface of the plate 7 has reached P1, he interpolator 97 (FIG. 7) computes for the section P1B a zero $hx$ value and a negative $hy$ value. The electric valve 93 closes, but the wire 15 maintains the previous inclination with respect to the plane YZ, because the inlet of oil under pressure into the cylinder 66 (FIG. 2) through the electric valve 92 (FIG. 7) is lacking, as already explained hereinbefore.

Since $hy$ is negative, the sign decoder 107 (FIG. 7) activates the gate 108, which allows the output signal of the decoder 106 to the decoder 106 to energize the circuit 110, which commands the opening of the electric valve 94. This introduces oil under pressure into the chamber 76 of the cylinder 67 (FIG. 5), shifting the slide 70 until it is arrested with the upper wall of the slot 89 against the stop pin 77.

During the movement of the slide 70, the rack 72 rotates the gear 37 clockwise together with the cams 39 and 40 (FIGS. 3 and 4), the first of which shifts the arm 24 to the left in a direction perpendicular to the axis Y in opposition to the action of the spring 47, while the second shifts the arm 25 to the right also in a direction perpendicular to the axis Y in opposition to the action of the spring 58.

At the end of the movement of the slide 70, the wire 15 has reversed its inclination with respect to the plane XZ, being now inclined with respect to this plane by a positive angle $\alpha$.

Throughout the time in which the wire 15 reverses its inclination, the tables 4 and 5 remain substantially stationary and therefore, while the point of contact of the wire 15 with the lower surface of the plate 7 (FIG. 9) remains at P1, the point of contact with the upper surface shifts from the point N to the point Q. In fact, the wire 15, turning about the point P1, still finds material to be cut and, therefore, the adaptive control unit 98 will substantially impose a stop on the tables 4 and 5. The turning of the wire 15 about the point P1 having been completed, the wire cuts the section P1B, reaching the position indicated by the points B and R.

To cut the section BC, the interpolator 97 computes a negative value of $hx$ and a zero value of $hy$. The wire 15 maintains the inclination hwich it had with respect to the plane YZ. In fact, the sign decoder 100 (FIG. 7) activates the gate 102, which allows the output signal of the decoder 99 to energize the circuit 104, which commands the opening of the electric valve 92. This actuates the hydraulic cylinder 66 (FIG. 2) with a consequent anticlockwise rotation of the gear 38 and of the cams 42 and 43 (FIGS. 3 and 4). The cam 42 causes the arm 24 to turn anticlockwise under the action of the spring 53, while the cam causes the arm 25 to turn clockwise under the action of the spring 64.

The wire 15 therefore turns with respect to the plane YZ, reversing its inclination until it is inclined with respect to this plane by the positive angle $\alpha$. Similarly to what has been said hereinbefore, the tables 4 and 5 remain substantially stationary during this turning action and the wire 15 turns about a point B until it brings its point of contact with the upper surface of the plate 7 to the point S.

The tables 4 and 5 now resume their movements and the cutting of the profile 113 continues as far as the point F without the wire 15 changing its positive inclination with respect to both planes XZ and YZ. This is obvious inasmuch as the quantities $hx$ and $hy$ appertaining to the sections BC, CD, DE and EF are maintained negative or zero, whereas, as has been seen hereinbefore, a reversal of the movement of the coordinated axes X and Y is necessary so that the wire 15 may reverse its inclination.

It is necessary to note that in the profile sections parallel to the coordinated axes X and Y the rake of the cut surface is equal to the angle through which the wire 15 turns with respect to each of the planes XZ and YZ, while in the section DE not parallel to the axes X and Y the rake obtained is greater than this angle. In fact, for each profile section, the wire 15 cuts the plate 7 keeping itself inclined with respect to the profile itself. Therefore, in the inclined sections, like the section DE, there is an increase in the rake $\alpha$, which is at the maximum when the inclination of the inclined section is 45°.

When the wire reaches the position FT, the interpolator 97 computes the quantity $hy$ corresponding to the section FG, which is positive. The wire 15 therefore turns about the point F and its point of contact with the upper surface of the plate 7 shifts from the point T to the point U. The cutting continues in a similar manner in the sections FG, GH, HA AP1, with the wire 15 inclined in the various sections as indicated in FIG. 9.

In curvilinear profile sections, like the section GH, there is a gradual increase in the rake which will be at a maximum when the tangent to the profile is inclined by 45° to the said axes.

It is necessary to note that the range of values of the rake which can be obtained with the machine is substantially unlimited, it being possible to vary the maximum stroke of the slide 70 at will by suitably dimensioning the cylinders 66 and 67 and the slot 89 or other parameters which have an effect on the movement of the heads 12 and 13, such as the profile of the cams, the length of the arms 24 and 25, etcetera.

By way of example, in the above-described machine, two values of the rake can be obtained according to whether the cotter 83 is inserted in the slot 86 or 87 (FIG. 6).

In one case relating to the foregoing description, the cotter 83 is inserted in the slot 87 and the rake $\alpha$ produced by the machine is 10'.

In the other case, the cotter 83 is inserted in the slot 86 and the slide 70 can slide substantially as far as the ends of the cylinder 67. In this instance, the machine produces a rake of 2°. Finally, by placing the cotter 83 in the slot 88, the movement of the slides 70 is prevented, as a result of which the cutting is effected without a rake.

The wire 15 can also be returned to the inoperative position perpendicular to one of the axes X and Y or to both, by inserting the cotter 83 manually in the slot 88 in the cylinder 66 or 67 or in both, during the operation of the machine. In fact, at the first stage of reversal of a coordinated axis X or Y following this operation, during the movement of the slide 70 it presents the hole 90 in front of the stop pin 77, which is introduced therein by the action of the spring 79, locking the slide 70 in the medium inoperative position, as a result of which the rake can be excluded on one or more edges of the cut.

The return of the slide 70 to the median inoperative position can be entrusted to two compression springs. In this case, the return of the slide 70 can be obtained automatically in the cylinder 66 or 67 whenever a quantity $hx$ or $hy$ is cancelled. In consequence, in the profile sections parallel to the axis X or Y, the wire 15 will be inclined only with respect to the plane YZ or XZ, that is a substantial modification of the rake with respect to the preceding version is not entailed.

Figure 10:
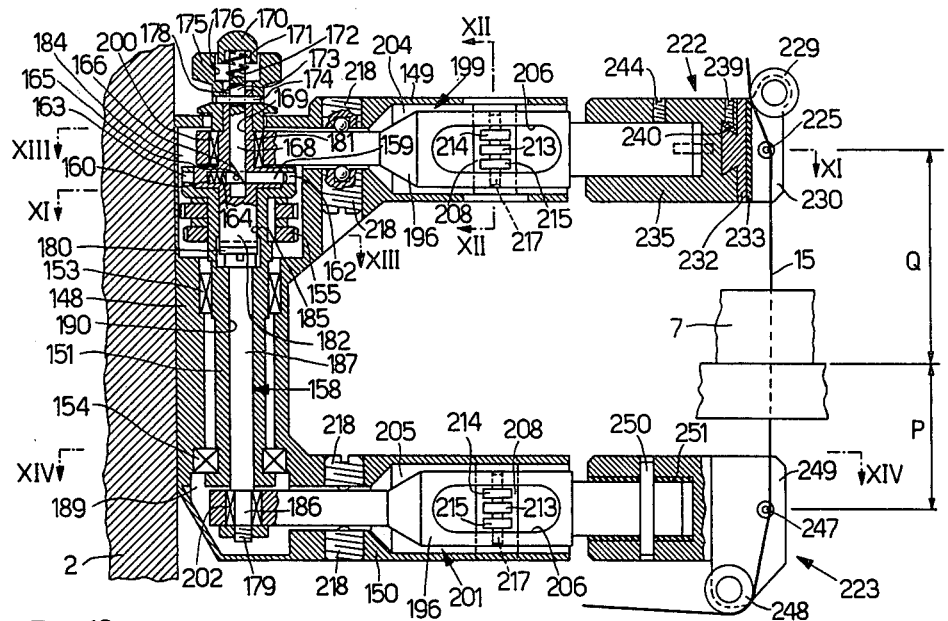
FIG. 10 is a partial vertical section of the machine on a larger scale in accordance with another embodiment of the invention.

According to another embodiment of the invention, on the standard 2 (FIGS. 1 and 10) there is fixed a frame 148 at the ends of which are fixed two hollow projections 149 and 150 (FIG. 10). Inside the frame 148 there is mounted a sleeve 151 rotatable in two rolling bearings 153 and 154 housed in the frame 148.

Figure 11:
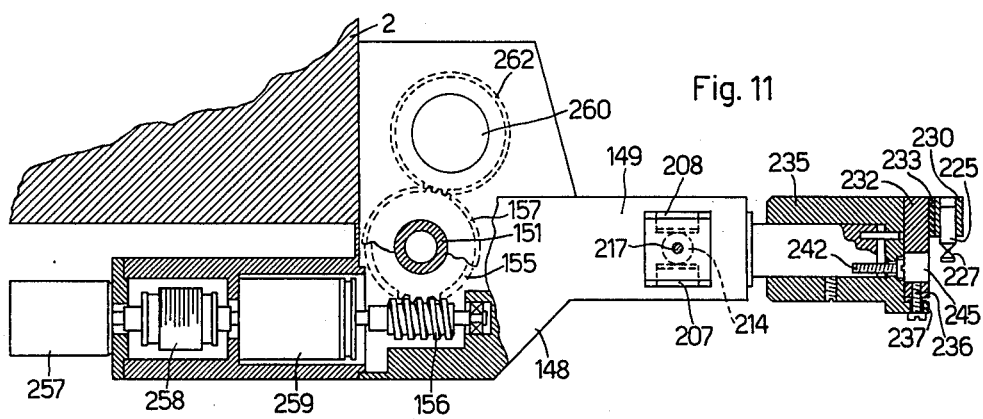
FIG. 11 is a section taken on the line XI—XI of FIG. 10.

On the sleeve 151 there is fixed a worm wheel 155, which is in mesh with a worm 156 (FIG. 11).

Inside the sleeve 151 there is housed a shaft 158 which is normally fast with the sleeve 151 through the medium of a cotter pin 159 inserted in a hole 160 in the shaft 158 itself. More particularly, the cotter pin 159 is slidable in the hole 160 and is urged radially outwards by a compression spring 164 to engage with one or the other of two diametrically opposite holes 162 and 163 in the sleeve 151. The cotter 159 is provided with a stud 165 which there can engage an inclined surface 166 of a pin 168 slidable in an axial hole 169 of the shaft 158. The upper end of the pin 168 is shaped in the form of a key 170 having a cavity 171 in which a compression spring 172 is housed.

The pin 168 is provided with an opening 173 through which extends a cotter pin 174 fast with the shaft 158 and with a knob 175. This knob is provided with a cavity 176 in which the key 170 can move. The shaft 158 is in effect constituted by two half shafts, an upper half shaft 178 and a lower half shaft 179 interconnected by a joint 180 known per se and adapted to allow a certain offset between the two half shafts 178 and 179. The upper half shaft 178 has two eccentric portions 181 and 182, the first of which is located in correspondence with a hollow space 184 of the frame 148, while the second is housed rotatably in a corresponding eccentric seat 185 of the sleeve 151. The lower half shaft 179 also has two eccentric portions 186 and 187, the first of which is located in correspondence with a hollow space 189 of the frame 148, while the second is housed rotatably in a corresponding eccentric seat 190 of the sleeve 151.

When the cotter 159 is inserted in the hole 162 as in FIG. 10, the axis of the eccentric portion 182 (FIG. 13) is eccentric to the left by an amount $q$ with respect to the axis of the sleeve 151, while the axis of the eccentric portion 181 is also eccentric to the left by an amount $2q$ with respect to the axis of the sleeve 151. Similarly, the axis (FIG. 14) of the eccentric portion 187 is eccentric to the right by an amount $p$ with respect to the axis of the sleeve 151, while the axis of the eccentric portion 186 is also eccentric to the right by an amount $2p$ with respect to the axis of the sleeve 151. The quantities or amounts $q$ and $p$ are in a predetermined relation to one another to which reference will be made hereinafter.

Figures 12, 13, 14:
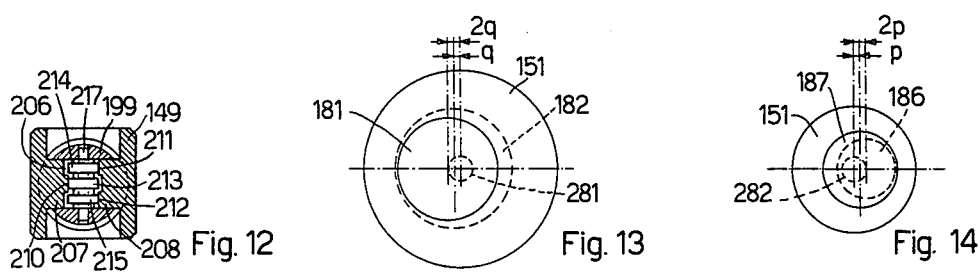
FIG. 12 is a section taken on the line XII—XII of FIG. 10.
FIG. 13 is a section on a larger scale taken on the line XIII—XIII of FIG. 10.
FIG. 14 is a section on a larger scale taken on the line XIV—XIV of FIG. 10.

When the cotter 159 (FIG. 10) is inserted in the hole 163, the shaft 158 is rotated through 180° with respect to the sleeve 151 and the axes of the eccentric portions 181 and 186 coincide with the axis of the sleeve 151 (FIGS. 13 and 14).

Mounted on the eccentric portion 181 of the shaft 158 (FIG. 10) through the medium of a rolling bearing 200 is an arm 199 housed in the hollow space 184 of the frame 148 and in a cavity 204 of the projection 149. Mounted in turn on the eccentric portion 186 through the medium of another rolling bearing 202 is an arm 201 housed in the hollow space 189 of the frame 148 and in a cavity 205 of the projection 150. The arms 199 and 201 are also of equal length.

Each of the arms 199 and 201 has a cylindrical portion 196 having a slotted hole 206 which bears slidably on two prismatic guides 207 and 208 (FIG. 12) formed integrally in the cavities 204 and 205 of the projections 149, 150 (in FIG. 12 only the arm 199 is indicated in section). The guide 207 is provided with a vertical track 210 parallel to the axis of the respective arm 199, 201, while the guide 208 is provided with two tracks 211 and 212 which are also vertical and parallel to the first-mentioned track. On the tracks 210, 211, 212 there can roll three bearings 213, 214 and 215 mounted on a pin 217 (FIG. 10) fixed to the respective arm 199, 201 and the ends of which are fixed to the arms 199, 201 halfway along the length thereof. Finally, each of the arms 199 and 201 is guided between two vertically adjustable ball-bearing guide blocks 218.

At the ends of the arms 199 and 201 there are fixed two wireguiding heads 222 and 223. More particularly, the head 222 comprises a guide pin 225 having a groove 227 (FIG. 11) which guides the cutting wire 15, and a roller 229 (FIG. 10) on which the wire 15 bears slidably. The pin 225 and the roller 229 are fixed to a support 230 which is fixed on a dovetail guide 232 and is insulated with respect to the latter by an insulating plate 233. The guide 232 can move in a corresponding recess of a support 235 of the head 222 by means of an adjusting screw 236 which can be screwed into the body of the guide 232 (FIG. 11) and is retained axially by a lug 237 of the support 235. A locking screw 239 fixes the guide 232 in the desired position through the medium of a shoe 240.

The support 235 is movable in turn on the end of the arm 199 in the direction of the axis of the latter by means of a second adjusting screw 242 which can be screwed into the end of the arm and is retained axially by the same support 235. The support is then locked by means of a locking screw 244. The dovetail guide 232 is moreover provided with a through hole 245 in correspondence with the screw 242 for the purpose of acting on this screw.

The head 223 (FIG. 10) also comprises a guide pin 247 and a roller 248 similar to the corresponding elements 225 and 229 of the head 222 and fixed to a support 249. The support 249 is fixed at the end of the arm 201 by means of a ceramic insulating cotter pin 250. The support 249 is moreover insulated from the arm 201 by means of an insulating layer 251.

The two heads 222 and 223 are disposed on opposite sides with respect to the lower surface of the plate 7 to be cut and the wire 15 is divided by the said lower surface into two sections the length of which is indicated in FIG. 10 by the references Q and P and is proportional to the above-described eccentricities $q$ and $p$.

The worm 156 (FIG. 11) is rotated by a direct-current motor 257 through a flexible coupling 258 and a speed reducer 259 which are known per se. The machine comprises a resolver 260 having two fixed coils 271 and 272 (FIG. 16) and a movable coil 273. The rotor of the resolver 260 (FIG. 11), bearing the movable coil 273, is fast with a gear 262 meshing with a toothed wheel 157 fixed on the sleeve 151 (see also FIG. 10). The gear 262 is provided with a play take-up device known per se.

The rotary movements of the sleeve 151 are controlled by a negative feedback servosystem to which the motor 257 is subordinate.

Figure 15:
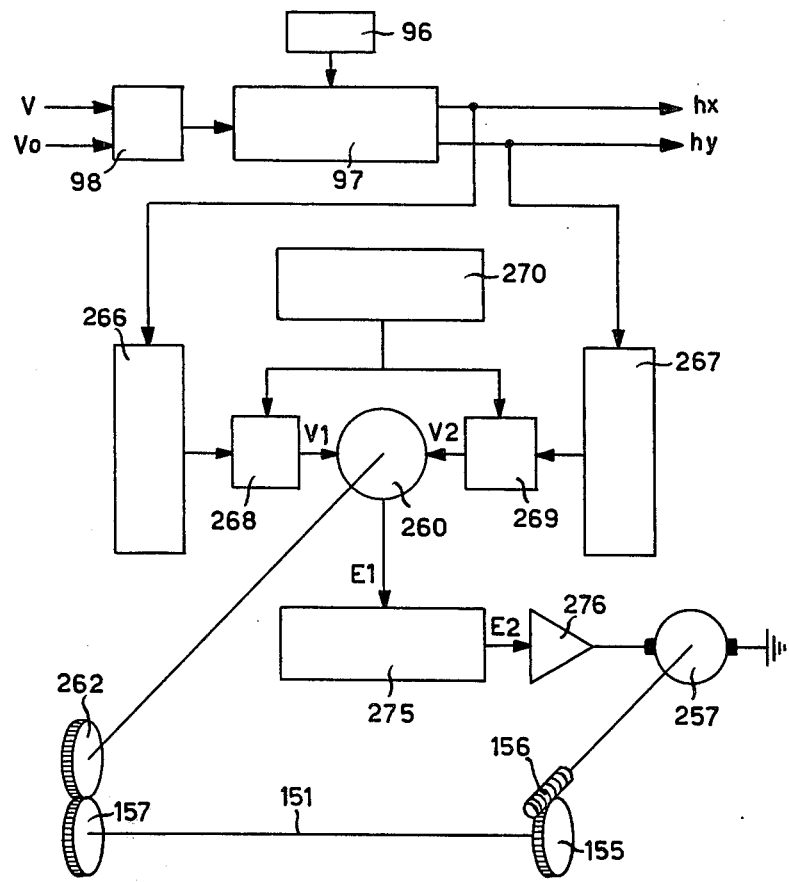
FIG. 15 is a block diagram of the control apparatus of the machine of FIG. 10.

This servosystem also comprises the punched tape reader 96 (FIG. 15), the adaptive control unit 98 and the linear interpolator 97.

Figure 16:
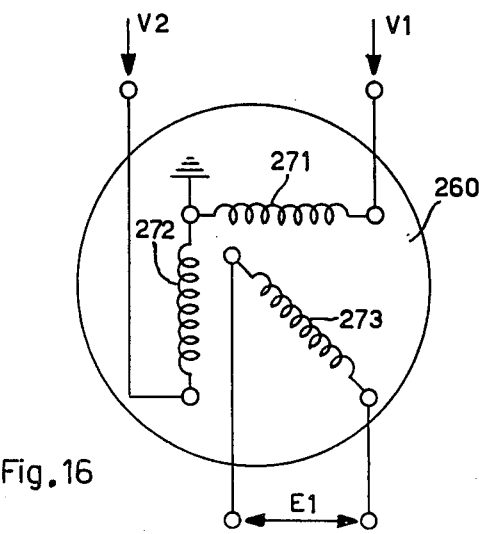
FIG. 16 is a diagrammatic representation of the resolver shown in FIG. 15.

The quantities $hx$ and $hy$ computed by the interpolator 97 are sent to two staticizing registers 266 and 267, respectively, of the flip-flop type. Each of the registers 266 and 267 has five hundred and twelve possible configurations, since it must store the 8-bit digits $hx$ and $hy$, plus their positive or negative sign. The digits stored in the registers 266 and 267 are converted into analogue signals $V_1$ and $V_2$, proportional to $hx$ and $hy$, respectively, by two digital-to-analogue converters 268 and 269, which are timed by an oscillator 270. The signals $V_1$ and $V_2$ are then input to the resolver 260 and go to supply the two fixed coils 271 and 272, respectively, of the resolver (FIG. 16).

As is known, the coils 271 and 272 produce the two components of a resultant magnetic field which are proportional to the signals $V_1$ and $V_2$ and therefore to $\Delta x$ and $\Delta y$, which are the movement increments of the tables 4 and 5. In fact, $\Delta x$ and $\Delta y$ are proportional to $hx$ and $hy$, being obtained by repeated addition of these quantities. The resultant field forms with the coils 271 and 272 two angles equal to the angles which the perpendicular to the profile of the workpiece obtained by the movement increment of the tables 4 and 5 forms with the coordinated axes X and Y.

The resolver 260 (FIG. 15) supplies as output an error signal E1 which represents in value and sign the angular deviation between the movable coil 273 (FIG.

16) and the resultant field. A demodulator 275 (FIG. 15) converts the signal E1 into the continuous signal E2, which is amplified by an amplifier 276 and feeds the motor 257. The motor causes the sleeve 151 (FIG. 11) to rotate by means of the worm 156 and the worm wheel 155. The rotary movements impressed by the motor 257 on the sleeve 151 are of the same sign and proportional to the aforesaid angular deviation. The speed of rotation of the motor 257 and the transmission ratio of the pair of elements consisting of the worm 156 and the worm wheel 155 are predetermined so that the speed of the rotary movements of the sleeve 151 is compatible with the electrical cutting conditions existing between the wire 15 and the plate 7 (FIG. 10). Through the medium of the pair of toothed wheels 157 and 262 (FIG. 11), the sleeve 151 causes the resolver 260 to rotate in turn in the sense in which the aforesaid deviation is reduced, until this deviation is nullified.

More particularly, since the toothed wheels 157 and 262 have an equal number of teeth and the resolver 260 has five hundred and twelve possible positions, there is a resolving power of the rotary movements of the sleeve 151 of about 42'. Moreover, the mutual position between the sleeve 151 and the resolver 260 is such that, when the quantity $hx$ is nullified and the quantity $hy$ is negative, the position of the shaft 158, with the cotter 159 inserted in the hole 162, is that indicated in FIGS. 13 and 14. In this position, the axes of the eccentric portions 181 and 186 are disposed on the axes of the arms 199 and 201, to the left and right, respectively, by the amounts $2q$ and $2p$ with respect to the axis of rotation of the sleeve 151. This position will be referred to hereinafter as the reference position.

The machine of FIG. 10 operates in the following manner.

Figure 18:
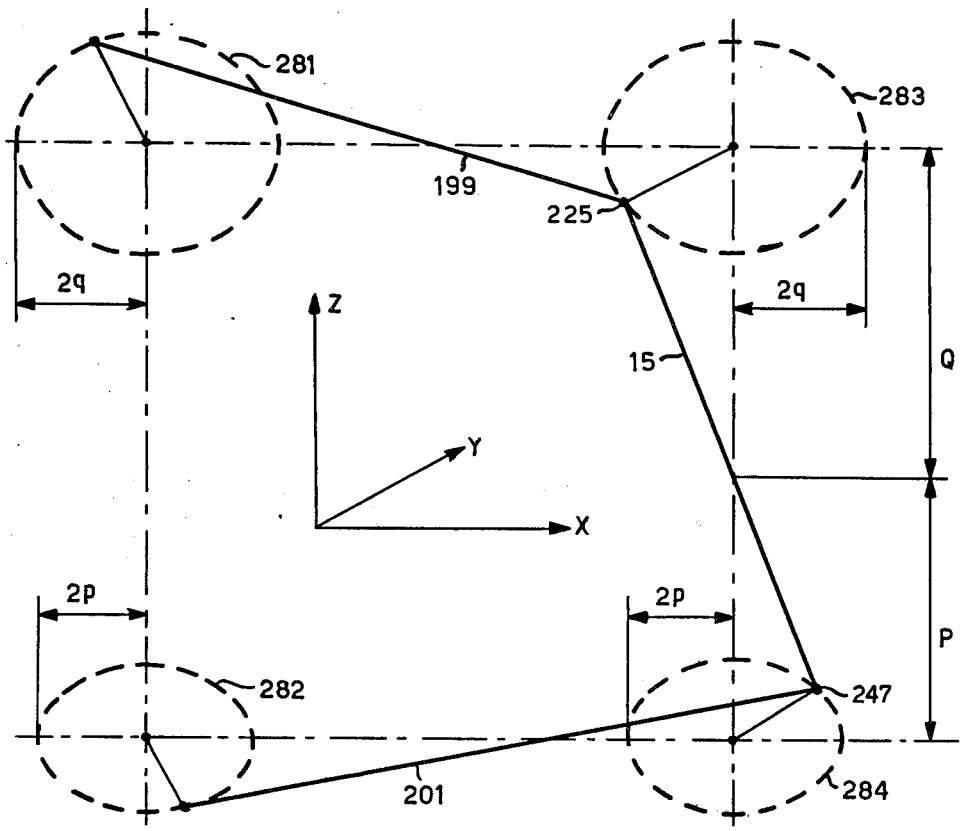
FIG. 18 is a diagrammatic representation of a movement of the connection or attachment points of the cutting wire of the machine.

FIGS. 13 and 14 show two circumferences 281 and 282 described respectively by the axis of the eccentric portion 181 and by the axis of the eccentric portion 186 in a complete revolution of the sleeve 151. FIG. 18 shows the circumferences 283 and 284 described by the heads 222 and 223 because of the rotations and movements that the arms 199 and 201 perform following the movement of the eccentric portions 181 and 186. More particularly, the circumferences 283 and 284 have a radius equal to $2q$ and $2p$ and are respectively equal to the circumferences 281 and 282, the pins 217 being located halfway along the arms 199 and 201. Moreover, the circumferences 281, 282, 283, 284 are located in the plane XY, the various movements of the arms 199 and 201 taking place in this plane. The wire 15 is therefore turned each time about the point of contact with the lower surface of the plate 7. This is due to the proportion obtaining between the lengths Q and P of the segments into which this surface divides the wire 15 and the legth of the radii of the circumferences 283 and 284 (FIG. 18). It will readily be understood that the wire 15 turns describing two cones having the circles 283 and 284 as bases. The apex about which the wire 15 turns is the point of contact with the lower surface of the plate 7. The rake that the wire 15 produces is now constant and is defined by the equation tg $\alpha = 2q/Q$, in which $\alpha$ is the rake itself.

Figure 17:
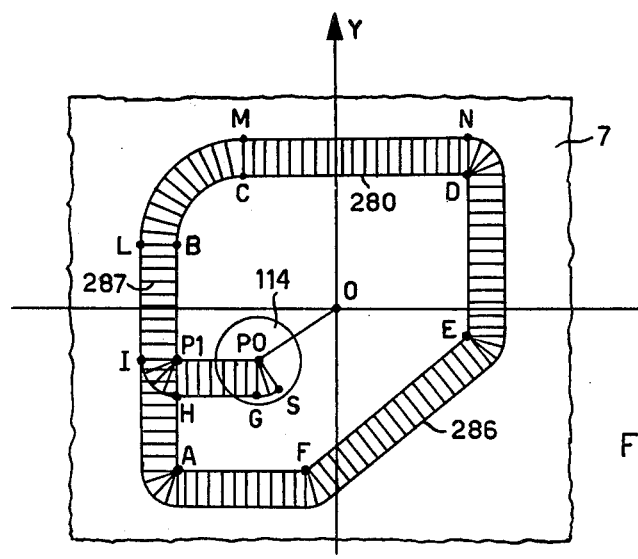
FIG. 17 shows the various cutting stages of the machine of FIG. 10.

Let it now be assumed that it is necessary to cut in the plate 7 (FIG. 17) an opening having a mixed-line profile 280. FIG. 17 shows the plate 7 as seen from above. The profile 280 is composed of sections with ends at the points A, B, C, D, E, F, with the sections AB, DE rectilinear and parallel to the axis Y, the sections CD, FA rectilinear and parallel to the axis X, the section EF rectilinear and inclined with respect to the axes X and Y, while BC is a circular arc. The plate 7 moreover has a through hole 114 located at the side of the mid point P1 of the section AB from which it is desired to begin the cutting, which is then executed following the profile 280 clockwise.

First of all, the heads 222 and 223 (FIG. 10) are brought on to the same vertical by inserting the cotter 159 in the hole 163 of the sleeve 151. To this end, it is necessary to lower the pin 168 by depressing the key 170 in opposition to the action of the spring 172. The inclined surface 166 of the pin 168, co-operating with the stud 165 of the cotter 159, shifts the latter to the left, withdrawing it from the hole 162. The knob 175 is then rotated, the key 170 being released at the same time. The pin 168 returns upwardly through the action of the spring 172, releasing the cotter 159, as a result of which when it is in correspondence with the hole 163 it is inserted therein by the spring 164.

When the cotter 159 is inserted in the hole 163, the axes of the eccentric portions 181 and 186 coincide with the axis of the sleeve 151 (FIGS. 13 and 14) and, therefore, the arms 199 and 201 (FIG. 10) being of equal length, the heads 222 and 223 will be located on the same vertical to the plane XY.

As is known, the point 0, the centre of the plate 7, is now positioned on the vertical passing through the heads 222 and 223 (FIG. 10). The machine is then started with the supply unit 22 (FIG. 1) cut out. The tape reader 96 (FIG. 15) reads the first block of instructions, which supplies the co-ordinates of the point P0 (FIG. 17) inside the hole 114 and located at the same distance as the point P1 from the axis X. The interpolator 97 (FIG. 15) computes the quantities $hx$ and $hy$ corresponding to the movement of the tables 4 and 5 adapted to bring the point P0 to 0.

The positive quantities $hx$ and $hy$ are stored by the registers 266 and 267. Through the digital-to-analogue converter 268, the register 266 transmits the signal $V_1$ to the coil 271 (FIG. 16) of the resolver 260 and a field proportional to $hx$ is therefore generated in this coil 271. Similarly, through the converter 269, the register 267 (FIG. 15) transmits the signal $V_2$ to the coil 272 (FIG. 16), in which a field proportional to $hy$ is generated. The resolver 260 then supplies as output the positive signal E1 proportional to the angular deviation between the movable coil 273 and the resultant field. The signal E1, demodulated and amplified by the demodulator 275 and the amplifier 276, respectively, feeds the motor 257. The motor, by means of the worm 156 (FIG. 11) and the worm wheel 155, rotates the sleeve 151 anticlockwise. This, in turn, rotates by the same amount, but in the opposite sense, the movable coil 273 of the resolver 260, reducing the angular deviation thereof until it is nullified. The rotation of the sleeve 151 is followed by the shaft 158 (FIG. 10), but this does not cause any shifting of the arms 199 and 201 and the heads 222 and 223, the axes of the portions 181 and 186 being in coincidence with the axis of the sleeve 151. When the point P0 (FIG. 17) reaches 0, the tables 4 and 5 stop.

The operator then mounts the wire 15 on the machine, causing it to pass through the hole 114. The wire 15 mounted in this way now passes exactly through the point P0 and should be vertical, the heads 222 and 223 not having shifted. If the wire 15 is not exactly vertical, a further adjustment of the position of the heads 222 and 223 can be made by means of the adjusting screws 236 and 242, with which the upper head can be moved perpendicularly and parallel to the axis of the arm 199.

Before beginning the cutting of the section P0-P1, the cotter 159 (FIG. 10) is inserted in the hole 162 by an operation similar to that already described for inserting it in the hole 163. The shaft is now rotated through 180° with respect to the previous position, while the sleeve 151 remains stationary. The eccentric portions 181 and 186 then cause the arms 199 and 201 to move and they incline the wire 15 in accordance with the rake which should be required by the movement P0-0. This movement can take place freely, since the wire 15 is in the hole 114.

In a second stage, the operator switches on the supply unit 22 (FIG. 1) and starts the machine. The tape reader 96 (FIG. 15) now supplies the co-ordinates of the point P1 (see also FIG. 17) to the interpolator 97, which computes the quantities $hx$ and $hy$ corresponding to the distance of movement of the tables 4 and 5. The quantity $hx$ is positive and is stored by the register 266, while the quantity $hy$ is zero. Through the digital-to-analogue converter 268, the register 266 transmits the signal $V_1$ to the fixed coil 271 (FIG. 16) of the resolver 260, while no signal reaches the coil 272.

The position of the movable coil 273 at the instant when the signal $V_1$ arrives depends on the direction of the segment P0-0 previously travelled by the plate 7. Since, as has already been seen, this movable coil 273 is disposed with respect to the fixed coils 271 and 272 in accordance with the perpendicular to the profile, the coil 273 is now disposed perpendicularly to the segment P0-0. There is therefore an angular deviation between the coil 273 and the direction of the resultant field, which coincides for the section P0-P1 with the field of the coil 271. This angular deviation is obviously equal to the angle between the segment P0-0 and the segment P1-P0.

The resolver 260 supplies as output a positive signal E1 proportional to the angular deviation. The signal E1, demodulated by the demodulator 275 and amplified by the amplifier 276, feeds the motor 257. By means of the worm 156 and the worm wheel 155, the motor rotates the sleeve 151 anticlockwise and, by means of the wheels 157 and 262, the sleeve causes the coil 273 of the resolver 260 to rotate by the same amount but clockwise, reducing the angular deviation thereof until it is nullified. When this angular deviation is nullified, the sleeve 151, which has performed the same rotation as the resolver 260, is rotated clockwise through 90° with respect to the mentioned reference position, together with the shaft 158 (FIG. 10), so that the eccentric portions 181 and 186 cause the arms 199 and 201 to be shifted correspondingly.

In FIG. 17, a line 286 indicates the line described by the point of contact of the wire 15 with the upper surface of the plate 7. This line 286 shows that the aforesaid point of contact has shifted from the point S corresponding to the section 0-P0 to the point G corresponding to the section P0-P1. In the zone between the two lines 280 and 286 there are marked segments 287 which indicate in various positions the segment of wire 15 between the two surfaces, that is the upper and lower surfaces, of the plate 7 in which the wire 15 is rotated through a negative rake with respect to the plane ZY and perpendicular to the section P0-P1 of the profile 280. The wire 15 therefore cuts the section P0-P1 (FIGS. 15 and 17) as far as the point P1, keeping itself constantly inclined by the same rake. This is the case inasmuch as the quantities $hx$ and $hy$ remain equal for the whole of the section P0-P1.

When the wire 15 has reached P1, the interpolator 97 computes for the section P1-B the two values $hx$ equal to zero and $hy$ negative which correspond to the mentioned reference position. The servosystem which controls the rotations of the sleeve 151 therefore brings the axes 181 and 186 of the eccentric portions into the reference position by means of an anticlockwise rotation of the same sleeve 151 through 90°. The heads 222 and 223 (FIG. 18) rotate clockwise along the circumferences 283 and 284, rotating the wire 15 in their turn by the same amount. The wire 15 is finally inclined positively with respect to the plane XZ by the angle $\alpha$.

Throughout the time in which the wire 15 rotates or turns, the tables 4 and 5 remain substantially stationary owing to the intervention of the adaptive control unit 98 (FIG. 15), and therefore the point of contact of the wire 15 with the lower surface of the plate 7 remains substantially at P1 (FIG. 17), while the point of contact with the upper surface shifts from the point H to the point I. The wire 15 then cuts the section P1-B, reaching the position indicated by the points B and L.

The section BC is covered through a segmentation. To form the segments into which the section BC is divided, the interpolator computes the quantities $hx$ and $hy$ of each segment at the end of the cutting of the preceding segment, in known manner. For the $n$th segment, the resolver 260 (FIG. 15) detects a negative angular deviation with respect to the preceding segment, translating it into the error signal E1, which is always negative in this case. This signal acts on the servosystem, which causes the sleeve 151 to turn anticlockwise through an angle equal to the angular deviation. The sleeve 151, in turn, rotates clockwise through the same angle the heads 222 and 223 bearing the wire 15 perpendicular to the aforesaid $n$th segment. This is repeated for the $n + 1$th segment and so on. The section BC is therefore cut with a constant rake, the wire 15 being kept always perpendicular to the segments into which this section is subdivided. The cutting continues in similar manner in the sections CD, DE, EF, FA, AP1 with the wire 15 inclined in the various sections as indicated in FIG. 17.

It is clear from the foregoing that the cutting wire 15 is supported at two points 12, 13 and 225, 247 on opposite sides with respect to the workpiece to be cut and that these points are movable so as to effect a cutting inclined variably with respect to the surface of the piece 7. More particularly, as regards the machine of FIG. 10, with variation in any manner whatsoever of the inclination of the profile to be cut with respect to the coordinated axes X and Y, the wire 15 is maintained constantly perpendicular to the profile throughout the cutting of the plate 7 and produces a constant rake along the whole of the said profile.

It is understood that various other modifications, improvements and additions of parts may be made in the machines for cutting metal workpieces which have been described hereinbefore without departing from the scope of the invention. For example, the interpolator 97 may be of circular type instead of linear type. In this case, the quantities $hx$ and $hy$ are variable from point to point, without substantial differences in the execution of the rake. Moreover, the machine programme may be prearranged so that when there is a sudden change of direction in the profile to be cut, for example at the angles of the profile, the interpolator 97 is inhibited during the turning of the wire 15, so that in these zones the regulation of the speed of movement of the wire 15 is effected by the adaptive control unit 98, which controls the electric valves 92–95 (FIG. 7) of the machine of FIGS. 2–7, or the motor 257 of the machine of FIGS. 10–17.

What is claimed is:

1. Apparatus for cutting a metal workpiece by electroerosion, comprising:
    an electrode tool maintained by two tool supports on opposite sides of a workpiece to be cut;
    controllable means for adjusting the position of at least one of said tool supports for variably inclining said tool with respect to a reference plane associated with said workpiece to position said tool at a cutting angle;
    means for relatively displacing said workpiece and said one tool support along a pair of coordinates for cutting said workpiece along a predetermined path defined by variable acceleration components of the predetermined path; and
    means solely responsive to said variable acceleration components for controlling said adjusting means in accordance with said variable acceleration components to maintain the tool at a cutting angle during the cutting along said predetermined path.

2. Apparatus for cutting a metal workpiece by electroerosion in which an electrode tool is maintained by two tool supports on opposite sides of a workpiece to be cut, comprising:
    a movable workpiece support for moving said workpiece relative to said electrode tool on a reference plane associated with said workpiece and defined in accordance with two orthogonal coordinate axes;
    feed means responsive to position signals for effecting said relative movement of said workpiece support and said tool for enabling a predetermined profile to be cut in said workpiece;
    adjusting means responsive to command signals for adjusting the position of at least one of said tool supports relative to the other for enabling said electrode tool to have a cutting angle with respect to the perpendicular to said reference plane;
    interpolating means fed on the basis of a path defined in digital form on a record member and on the basis of the voltage between the tool and the workpiece for generating said position signals defining the movements of said workpiece support with respect to said orthogonal coordinate axes as a function of variable acceleration components along said axes to effect the cutting of the workpiece along said profile according to the defined path; and
    intermediate means solely responsive to said variable acceleration components for generating said command signals which are supplied to said adjusting means for adjusting the position of said tool supports to maintain the electrode tool at a cutting angle as said workpiece is cut along the profile.

3. Apparatus according to claim 2, further comprising means responsive to the potential between said tool and the workpiece to arrest temporarily movement of said workpiece support during the intervals in which the adjusting means are effecting the movements of said tool supports.

4. Apparatus as set forth in claim 2, wherein the positions of said tool supports are adjustable in directions parallel to said reference plane.

5. Apparatus as set forth in claim 2, wherein said tool comprises a wire member tensioned between said tool supports and adapted to be excited by a voltage for effecting cutting of said profile in said workpiece.

6. Apparatus as set forth in claim 2, wherein said tool supports are adjustable in opposite directions for causing said tool to always intersect said reference plane and said profile.

7. Apparatus as set forth in claim 2, wherein said adjusting means rotates said tool about each of said coordinate axes by an angle from the perpendicular to said reference plane whose sense is determined by the feed direction of said workpiece support along that axis.

8. Apparatus according to claim 7, wherein the magnitude of said angle is constant in respect of each axis.

9. Apparatus according to claim 7, wherein said adjusting means maintains the angle of rotation about either axis as long as the feed direction of said workpiece support along that axis is constant or there is no feed along that axis and only reverses the sense of the angle when feed along that axis in the opposite direction is instituted.

10. Apparatus according to claim 9, wherein said adjusting means restores said tool to a position in which the angle from the perpendicular about either axis is zero when there is no feed along that axis.

11. Apparatus according to claim 7, wherein said tool supports are disposed at the ends of two corresponding arms movable in two planes parallel to said reference plane, whereby said tool supports are shifted in opposite directions.

12. Apparatus according to claim 11, wherein the movements of the arms are produced by means of two pairs of cams, each of the pairs being formed by cams of like profile but mutually offset through 180°, the said two planes being equidistant from said reference plane and the two cams of each pair acting on the two arms respectively.

13. Apparatus according to claim 12, wherein the rotation of each of the pairs of cams is obtained by means of a corresponding hydraulic device controlled in conjunction with the movement of said workpiece support.

14. Apparatus according to claim 13, wherein the hydraulic device comprises a cylinder and a piston fixed with a rack meshing with a pinion, the cams of the corresponding pair being coaxial and fixed with the pinion.

15. Apparatus according to claim 14, wherein each of the arms comprises a slider slidable on and pivoting on an element carried by an associated fixed support, one pair of the cams engaging the corresponding sliders in such manner as to cause each of them to slide on the said element, the other pair of cams engaging the sliders in such manner as to cause each of them to pivot about the said elements.

16. Apparatus according to claim 15, wherein each of said elements is constituted by a pin engaging a slotted hole disposed longitudinally in the corresponding slider, spring means being provided to urge each slider into engagement with the corresponding cams of the two pairs.

17. Apparatus according to claim 16, wherein the two pairs of cams are disposed on cam axes parallel to one another and perpendicular to the sliders, the two cylinders being disposed in two different planes perpendicular to the cam axes.

18. Apparatus according to claim 17, comprising means capable of being preset manually to limit the stroke of the hydraulic piston so as to select the angle of said tool.

19. Apparatus according to claim 7, wherein the adjusting means cause the angles of rotation about the two axis to be such that the magnitude of the angle of rotation of said tool about the actual feed direction of the table, compounded of the feed along the two axes, is constant.

20. Apparatus according to claim 19, wherein the adjusting means comprise two first eccentric members acting on the two tool supports respectively to displace said two tool supports in opposite directions by constant amounts proportional to the distance of said tool supports from said reference plane, which directions are parallel to a line in said reference plane with an orientation determined by the rotational angle of the eccentric members, the adjusting means including a servomechanism adapted so to rotate the eccentric members that the said line is perpendicular to the actual cutting direction.

21. Apparatus according to claim 20, wherein the servomechanism comprises a resolver with stator windings energized by signals proportional to the table velocities along the two coordinate axes and a rotor winding providing an error signal controlling a motor which drives the first eccentric members to null out the error signal.

22. Apparatus according to claim 21, wherein the two first eccentric members are each fixed with respect to a shaft, each shaft having a second eccentric member fixed thereto with an eccentricity of one half that of the corresponding first eccentric member and which is in phase therewith.

23. Apparatus according to claim 22, wherein each second eccentric member is housed in a corresponding hole of a common sleeve, each hole being offset with respect to the axis of the sleeve by an amount equal to the eccentricity of the corresponding second eccentric member.

24. Apparatus according to claim 23, wherein said shift is adapted to be fixed to the sleeve in two positions mutually offset through 180°, in one of which the first eccentric members are coaxial with the sleeve.

25. Apparatus according to claim 24, wherein the motor is adapted to rotate the eccentric members by use of a worm and a worm wheel.

26. Apparatus according to claim 25, wherein the rotor of said resolver is connected to the sleeve by use of a pair of gears with a one-to-one transmission ratio.

27. Apparatus according to claim 26, wherein each tool support is carried by an arm which comprises a slider slidable and pivoting on guide means carried by a corresponding fixed support, the first eccentric members engaging the corresponding sliders so as to cause them each to slide and pivot on the said elements.

28. Apparatus according to claim 27, wherein the guide means comprise a pin on which the corresponding arm can pivot and slide and which is located halfway between the two ends of the corresponding arm.

29. Apparatus according to claim 2, wherein said workpiece support is moved along the two axes under the control of interpolator means controlled on the basis of a path recorded in digital form a recording member and on the basis of the voltage between said tool and the workpiece, said interpolator means being adapted to generate command signals for the movement of said tool supports in planes parallel to the cutting plane.

30. Apparatus according to claim 29, further comprising adaptive control means for controlling the speed of said workpiece support relative to said tool in accordance with the voltage between said tool and the workpiece at predetermined time intervals.

31. Apparatus according to claim 30, wherein said interpolator means comprises means responsive to an element indicating the existence of the movement of said workpiece support along the corresponding coordinate axis, and by an element indicating the direction of movement of said workpiece support.

32. Apparatus according to claim 31, wherein the element indicating the direction of movement of said workpiece support is controlled by speed increment signals of the corresponding coordinate axis computed by the interpolator for each section of the profile defined by the dimensions recorded on the recording member.

* * * * *